United States Patent
Del Bon et al.

(10) Patent No.: US 6,550,371 B1
(45) Date of Patent: Apr. 22, 2003

(54) BREWING BAG FOR A FILTER COFFEE BREWING DEVICE

(75) Inventors: Franco Del Bon, Aarburg (CH); Ralph Grueniger, Jona (CH)

(73) Assignee: A. Kuster Sirocco-Kaffee AG, Schmerikon (CH)

( * ) Notice: Subject to any disclaimer, the term of this patent is extended or adjusted under 35 U.S.C. 154(b) by 0 days.

(21) Appl. No.: 09/869,863

(22) PCT Filed: Dec. 13, 1999

(86) PCT No.: PCT/CH99/00599

§ 371 (c)(1),
(2), (4) Date: Jul. 6, 2001

(87) PCT Pub. No.: WO00/40476

PCT Pub. Date: Jul. 13, 2000

(30) Foreign Application Priority Data

Jan. 8, 1999 (CH) .................................................. 33/99
Oct. 11, 1999 (CH) .............................................. 1850/99

(51) Int. Cl.[7] ........................ A47J 31/00; A47G 19/16; B65D 85/00
(52) U.S. Cl. ............................ 99/295; 99/306; 99/323; 426/77; 426/111; 426/112; 426/433
(58) Field of Search ........................ 99/295, 306, 307, 99/300, 299, 302 R, 323; 210/497.2, 507, 282; 426/77, 78, 81, 111, 112, 433, 435; 264/DIG. 48

(56) References Cited

U.S. PATENT DOCUMENTS

| 3,615,708 | A |   | 10/1971 | Abile-Gal |        |
|-----------|---|---|---------|-----------|--------|
| 3,971,305 | A | * | 7/1976  | Daswick   | 99/295 |
| 4,983,410 | A | * | 1/1991  | Dinos     | 426/77 |
| 5,298,267 | A | * | 3/1994  | Gruenbacher | 426/77 |
| 5,906,844 | A | * | 5/1999  | Stahl et al. | 426/77 |

FOREIGN PATENT DOCUMENTS

| DE | 35 04 441 A1 | 8/1986 |
| EP | 0 249 700 A2 | 4/1987 |
| EP | 0 361 569    | 9/1989 |
| EP | 0 806 373 A1 | 5/1996 |

\* cited by examiner

Primary Examiner—Reginald L. Alexander
(74) Attorney, Agent, or Firm—Burns, Doane, Swecker & Mathis, LLP

(57) ABSTRACT

A brewing bag includes liquid-permeable filter material for use in a filter coffee brewing apparatus and has an essentially cylindrical or prismatic shape with a bottom part, a jacket and a cover part. The wall of jacket is reinforced near the cover part and has a collar which protrudes over the cover part. An optimal brewing effect is achieved through forming the brewing bag in this special way.

9 Claims, 3 Drawing Sheets

BREWING BAG FOR A FILTER COFFEE BREWING DEVICE

BACKGROUND OF THE INVENTION

The present invention relates to a brewing bag made of a liquid-permeable filter material for use in a filter coffee brewing apparatus. This invention also relates to a filter coffee brewing apparatus provided with such a brewing bag. Furthermore, this invention relates to a process for the production of a brewing bag for a filter coffee brewing apparatus.

Commercial filter coffee brewing apparatuses, such as those used in particular in aeroplane kitchens, normally use ground coffee which is packed into brewing bags. Such filter coffee brewing apparatuses typically comprise a feed head for the provision of hot brewing water under overpressure, a usually cylindrical brewing inset for holding a brewing bag containing the coffee, a lifting device for bringing the brewing inset into leakproof arrangement with the feed head, and a collecting vessel for the brewed coffee.

The brewing bags normally used for these purposes which, depending on their size, contain up to about 200 g of coffee take the shape of a round pad of approximately lenticular cross section. This bag consists essentially of two circular pieces consisting of a liquid-permeable filter material which pieces are joined along their circumferential edges via cold- or hot-pressing/-stamping. The joined circumferential edges form a radial circumferential flange in the centre plane of the bag.

For their use these pad-shaped bags, which match the size of the brewing inset, are inserted into the cylindrical brewing inset and neatly stuffed in by hand in such a way that the circumferential flange formed by the circumferential edges folds upwards and snuggles as smoothly as possible to the interior wall of the brewing inset. Experience shows that due to the shape of the flange and its own small yet present stiffness the flange in most cases does not snuggle closely and evenly to the interior wall but is usually slightly wavy. However, this waviness creates unwanted secondary flow paths for the brewing water to flow past the brewing bag, which is additionally promoted by the overpressure of the brewing water. However, the fact that part of the brewing water flows via the secondary flow paths past the coffee in the brewing bag substantially impairs the quality of the coffee brewed in this manner. However, as modem tourists have increased demands regarding taste and as the airline companies constantly seek to improve their services also in the culinary area, very high demands are made on the quality of the brewed coffee which the conventional filter coffee brewing apparatuses cannot always and reproducibly fulfil.

From the generic EP-A-0 249 700 a filter coffee brewing apparatus with a brewing bag consisting of two layers of filter is known which, when in the state of being inserted in the brewing inset, has essentially about the shape of a truncated cone and matches the brewing inset, with a bottom part, a jacket part which forms one piece with the bottom part and a cover part, which cover part together with the jacket part forms a relatively broad or high double-walled protruding collar. The bottom part and the jacket part are formed by the lower filter layer and the cover part by the upper filter layer. The two filter layers are closely connected with each other in the collar area. In the brewing device a hot water outlet is provided above the brewing bag through which hot brewing water is led to the cover part of the bag when in operation. The headroom between the bottom of the brewing inset and the hot water outlet is kept relatively small so that the hot water outlet is at a relatively short distance above the cover part of the (still dry) brewing bag. When hot water is led in, the cover part of the brewing bag inflates due to the heat of the air escaping from the coffee powder within and through this snuggles relatively tightly around the hot water outlet. This is said to result in the brewing water being led centrally into the brewing bag and as a consequence the coffee powder is said to be well extracted.

SUMMARY OF THE INVENTION

Starting from the generic brewing bag, it is the object of this invention to create another brewing bag which on the one hand requires no complicated manipulation when inserting the brewing bag into the brewing inset and on the other hand warrants an optimal brewing result while preventing quality impairing secondary flow paths for the brewing water.

The object of this invention is achieved by forming the brewing bag of this invention in a special way.

The inventive shape of the brewing bag does not only warrant an optimal brewing process but also simplifies the handling since the bag can be effortlessly inserted into the brewing inset without needing to be stuffed in. This is also an advantage from the point of view of hygiene.

Many individual factors must be carefully coordinated for the high demands on the quality and taste of coffee to be met. These encompass also in particular the types of coffee used and their provenance, their mixture, degree of roasting, degree of grinding and so forth. The inventive brewing bag prevents that the quality standards that the coffee producer achieved at great expenditure are partly or even entirely lost in the brewing process.

BRIEF DESCRIPTION OF THE DRAWINGS

The invention is illustrated in more detail by the following drawings which show.

DETAILED DESCRIPTION OF THE PREFERRED EMBODIMENTS

Figure 1:
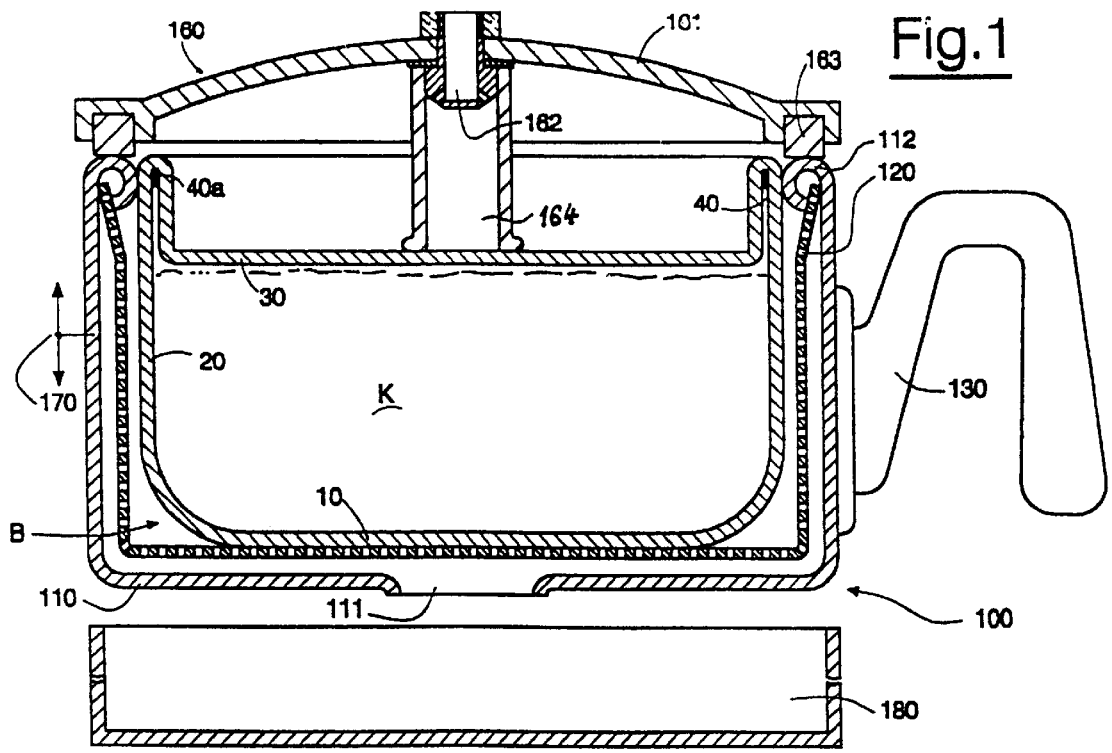
FIG. 1 a longitudinal section through those parts of the inventive filter coffee brewing apparatus, with inserted inventive brewing bag and before brewing water is supplied, which are most important for understanding this invention, FIG. 2 a longitudinal section in analogy to FIG. 1 during or after the supply with brewing water, FIGS. 3–7 detail sketches for illustrating the process of this invention for the production of the inventive brewing bag, and FIG. 8 an oblique view of the inventive brewing bag which is filled with coffee powder and ready for use.
Figure 2:
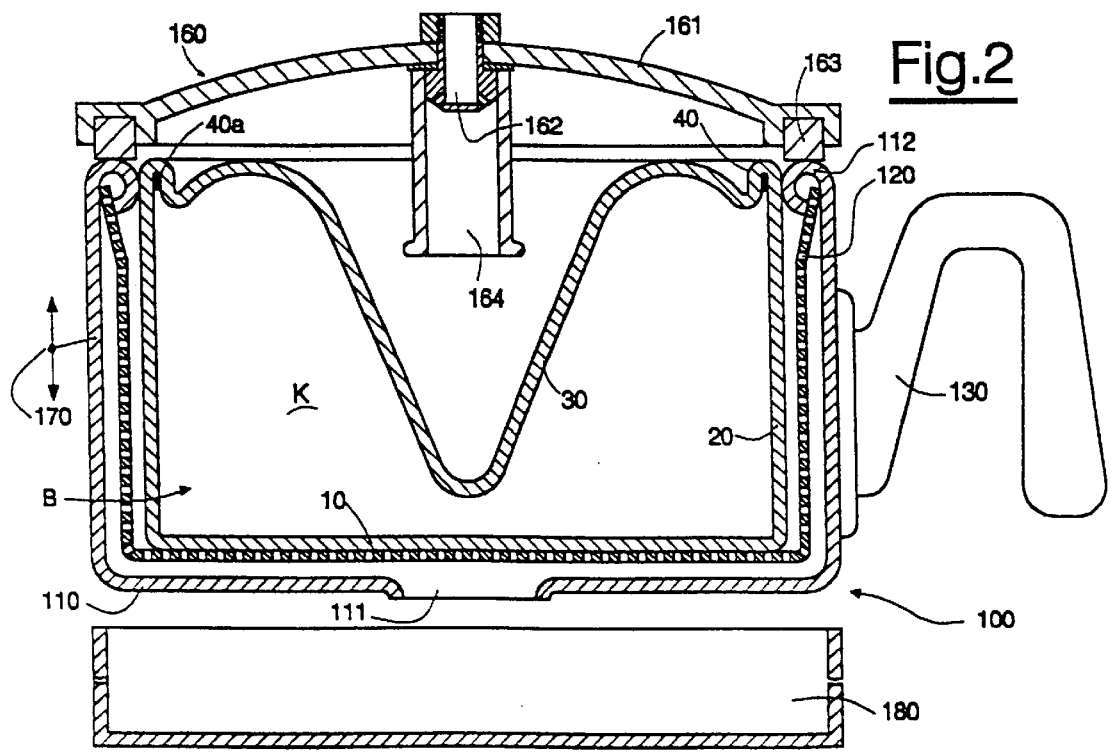
Figure 3:
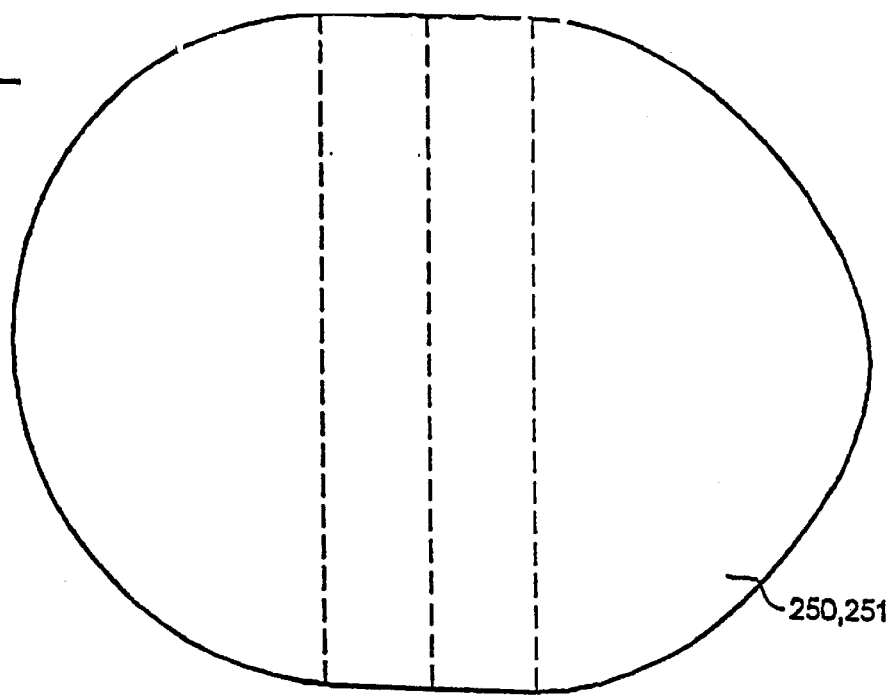

FIGS. 1 and 2 schematically show the most important components of the inventive filter coffee brewing apparatus. These are a brewing inset 100, a feed head 160, of which only a press-on lid 161 is depicted, a lifting device, which is only symbolically indicated by an arrow 170, as well as a collecting vessel 180 for the ready coffee.

The cylindrical brewing inset 100 is per se conventional and comprises a metal container 110 which is open on top and which is essentially pot-shaped, in which a metal strainer basket 120 is arranged which is likewise open on top and pot-shaped.

On the exterior of the container 110 there is a handle 130 and in the bottom of the container 110 there is a discharge aperture 111. The strainer basket 120 is clamped in a flanged edge 112 of the container 110.

The inventive brewing bag B is inserted in the container 110 and the strainer basket 120. As may also be seen in particular from FIG. 8, the inventive brewing bag B is essentially cylindrical and has a convex bottom part 10, a jacket 20 and an essentially even cover part 30 as well as an essentially cylindrical collar 40 which protrudes over the cover part and which essentially is an extension of the jacket. Inside of the brewing bag B is ground coffee K. The collar 40 snuggles wavelessly and closely all round to the interior wall of the brewing inset 100 and thus prevents that the brewing water can flow on the outside past the brewing bag B through the brewing inset. Like conventional brewing bags of this kind, this brewing bag is made of a liquid-permeable filter material, for example filter mat, which has a certain formability. Further details of the inventive brewing bag B and its production follow from the description following hereinafter based on FIGS. 3–8.

In its centre, the press-on lid 161 has a discharge nozzle 162 for brewing water and a discharge muff 164 surrounding the nozzle and at its circumference it has a joint ring 163 which interacts with the edge of the aperture 112 of the brewing inset 100 when the brewing inset is pressed against the press-on lid 161 by means of the press-on device 170. The feed head 160 provides hot brewing water under overpressure and contains a corresponding heating and pumping system or is connected to a corresponding brewing water inlet tube.

With the exception of the discharge muff 164, the filter coffee brewing apparatus of this invention is per se conventionally constructed and therefore does not require any further explanation for the person skilled in the art.

The discharge muff 164 provided according to this invention which surrounds or contains the discharge nozzle 162 has such a length that when the brewing inset 100 is inserted and lifted it extends directly or near to the cover part 30 of the inserted brewing bag B.

Because the brewing water is thus led directly to the cover part 30 of the brewing bag B via the discharge muff 164 and supported by the special form of the collar 40 of the brewing bag B, discussed further on, a deformation of that brewing bag B takes place during the supply of brewing water as shown in FIG. 2 and experience shows that this deformation results in an even better extraction of the coffee powder in the brewing bag and thus in a further quality increase of the coffee obtained.

The inventive brewing bag B is essentially cylindrical. However, it may also be prismatic instead of cylindrical in particular with a rectangular or square cross section, e.g. when it is to be used in a prismatic brewing inset. For the sake of simplicity, however, only a cylindrical working variant is discussed hereinafter, the explanations applying to prismatic working forms by analogy.

According to this invention, the wall of jacket 20 of the brewing bag B is reinforced near the cover part 30, which reinforced wall is in the area of the collar 40 and is formed by that collar itself.

The brewing bag B is matched to the interior dimensions of the brewing inset for which it is intended. Since in contrast to conventional bags it possesses an erect collar, it can be inserted very easily and comfortably into the brewing inset without any particular manipulation. Its erect collar 40 automatically fits closely to the interior edge 112 of the container 110 of the brewing inset 100. Another important feature is the wall reinforcement already mentioned. This wall reinforcement creates an additional flow barrier for the brewing water so that it is led reliably into the inside of the brewing bag.

It has furthermore been found to be very advantageous if the cover part 30 of the filled and closed brewing bag B is not too taught. Suitable dimensioning of the cover part and also of the degree of filling take care of this.

FIGS. 3–8 illustrate the process of this invention for the production of the inventive brewing bag.

Figure 4:
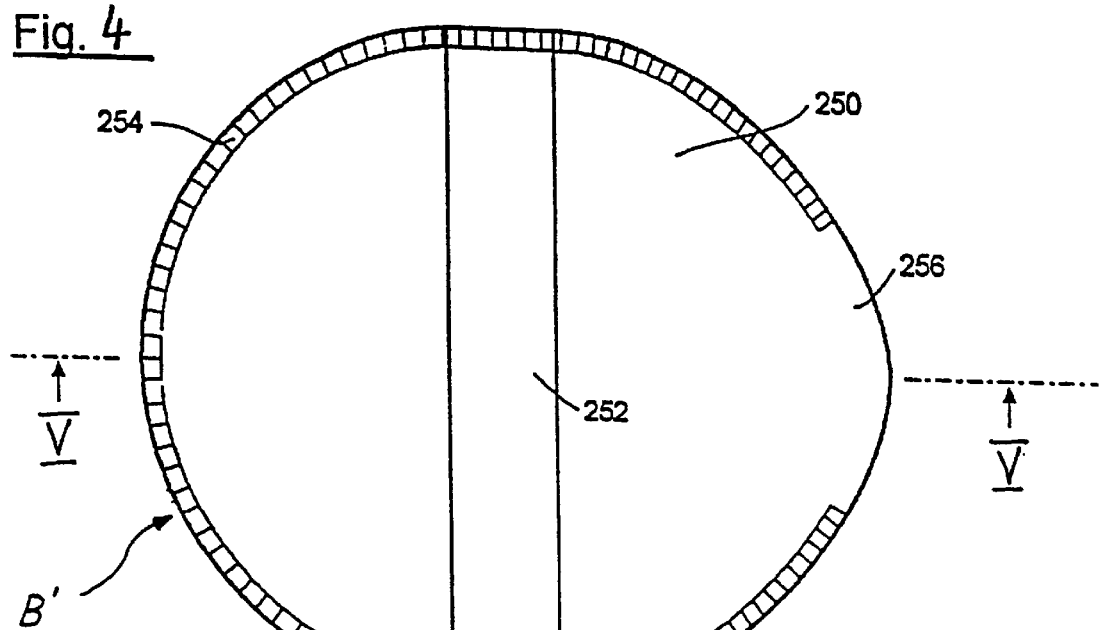
Figure 5:
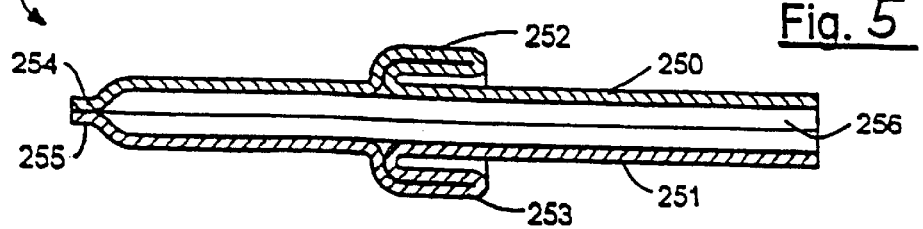
Figure 6:
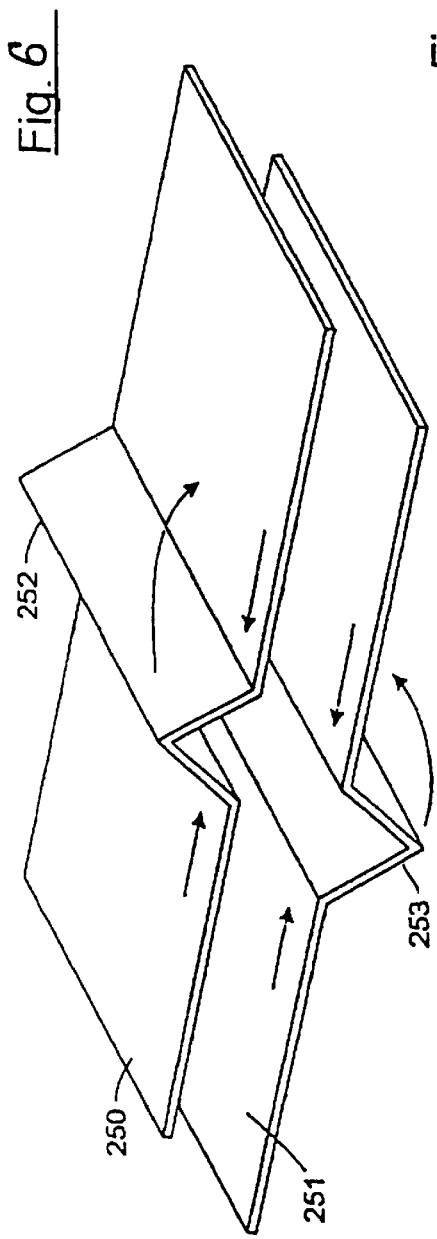

This process starts from two flat and essentially oval blanks 250 and 251 made of filter mat material (FIG. 3) which are each provided approximately in the centre with a flange crease 252 and 253. The process of the production of the flange creases becomes clear from the schematic presentation of FIG. 6. The flange creases 252 and 253 are fixed through pressing or stamping and, as far as possible, are folded over into the level of the blanks 250 and 251. This may be best seen from the cross sectional presentation of FIG. 5. The two blanks 250 and 251 are then placed next to or on each other and are joined along the largest part of their circumferential edges 254 and 255 such that an essentially flat bag B' is obtained which still has an aperture 256 in one place (FIGS. 4–5).

The tackfree joining of suitable filter materials is known per se and therefore does not require any further discussion.

The bag B' thus produced is now filled with coffee powder through the aperture 256 and is then closed in customary manner. The filled and as yet still pad-shaped bag B' is presented in FIG. 7.

Figure 8:
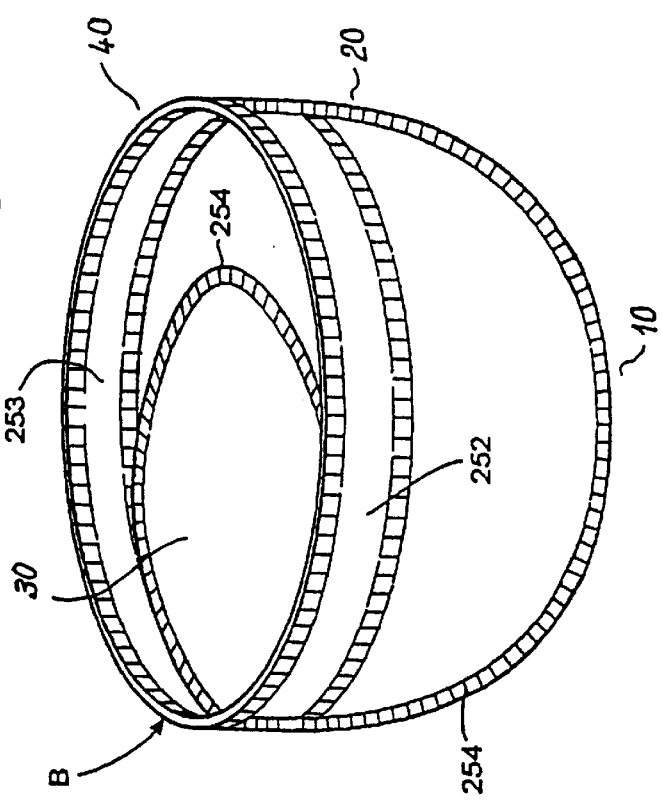
Figure 7:
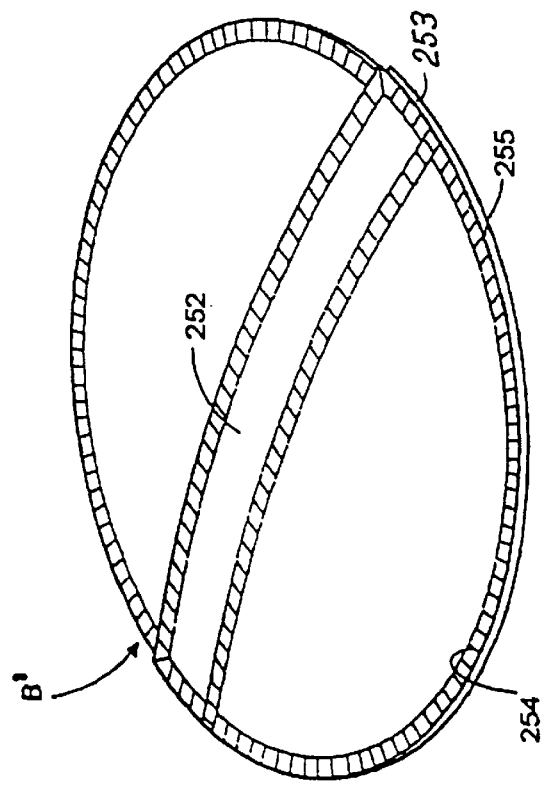

In the final production step the flat bag B' is brought into a cylindrical shape. This is achieved by drawing the two flange creases 252 and 253 apart correspondingly and folding that part of the bag B', provided with the in the meantime closed aperture 256, into or under the level of the ring-shaped collar which is formed by the flange creases 252 and 253. The finished cylindrical bag B is shown in FIG. 8.

An important feature of the brewing bag B is that its collar 40 is not sealed over its entire height but is not sealed at all or, as may be seen in FIG. 1, only in the top area 40a. Because of this its cover part can deform more easily during supply with brewing water (FIG. 2) which results in the mentioned improvement of the extraction effect.

What is claimed is:

1. A brewing bag comprising liquid-permeable filter material for use in a filter coffee brewing apparatus, which brewing bag when used has a bottom part, a jacket and a cover part as well as a double-walled collar which extends the jacket and protrudes over the cover part, wherein the brewing bag includes two essentially oval blanks of formable filter material which each have one flange crease and which are joined along their circumferential edges, those parts of the blanks lying on the one side of the flange creases forming the bottom and the jacket and those parts of the blanks lying on the other side of the flange creases forming the cover part, the two flange creases forming the double-walled collar of the brewing bag.

2. A brewing bag according to claim 1, wherein the double-walled collar is at most sealed in its top area.

3. A process for the production of a brewing bag for use in a filter coffee brewing apparatus, where a brewing bag filled with coffee is formed from a liquid-permeable filter material with a bottom part, a jacket and a cover part as well as with a double-walled collar protruding over the cover part, which comprises starting from two even and essentially oval blanks of formable filter material, providing the two blanks with one flange crease each, joining the two blanks along their circumferential edges to form a flat bag provided with an aperture, filling the flat bag through the aperture with coffee powder and closing its aperture, drawing the two flange creases apart to form a ring forming the double-walled collar, those parts of the blanks lying on the one side of the two flange creases forming the jacket and the bottom part of the bag thus obtained and those parts of the blanks lying on the other side of the flange creases being folded inwards to form the cover part of the bag thus obtained.

4. A filter coffee brewing apparatus with a feed head for the inlet of hot brewing water under overpressure, with a brewing inset in which there is a brewing bag filled with ground coffee, with a lifting device for bringing the brewing inset into leakproof arrangement with the feed head and with a collecting vessel for the brewed coffee, the brewing bag being of a shape matching the form of the brewing inset and having a bottom part, a jacket, a cover part and a double-walled collar protruding over the cover part, the collar snuggling closely all round to the interior wall of the brewing inset, wherein the brewing bag comprises two essentially oval blanks of formable filter material which each have one flange crease and which are joined along their circumferential edges, those parts of the blanks lying on the one side of the flange creases forming the bottom and the jacket and those parts of the blanks lying on the other side of the flange creases forming the cover part, the two flange creases forming the collar of the brewing bag, and wherein the feed head is provided with a discharge muff for the brewing water, and wherein when the brewing inset is inserted and in arrangement with the feed head the discharge muff extends at least closely to the cover part of the brewing bag which is inserted in the brewing inset.

5. A filter coffee brewing apparatus according to claim 4, wherein the double-walled collar of the brewing bag is at most sealed in its top area.

6. A brewing bag for use in a filter coffee brewing apparatus, comprising:

a bottom part;

a jacket;

a cover part; and a double-walled collar which extends the jacket and protrudes over the cover part, wherein the brewing bag includes two substantially symmetrical halves of liquid-permeable filter material joined together along their edges, each half forming half of the bottom part, jacket, cover part and double walled collar.

7. A brewing bag according to claim 6, wherein the double-walled collar is at most sealed in its top area.

8. A filter coffee brewing apparatus with a feed head for the inlet of hot brewing water under overpressure, with a brewing inset in which there is a brewing bag filled with ground coffee, with a lifting device for bringing the brewing inset into leakproof arrangement with the feed head and with a collecting vessel for the brewed coffee, the brewing bag being of a shape matching the form of the brewing inset and having a bottom part, a jacket, a cover part and a double-walled collar protruding over the cover part, the collar snuggling closely all round to the interior wall of the brewing inset, wherein the brewing bag comprises two substantially symmetrical halves of liquid-permeable filter material joined together along their edges, each half forming half of the bottom part, jacket, cover part and double walled collar, and wherein the feed head is provided with a discharge muff for the brewing water, and wherein when the brewing inset is inserted and in arrangement with the feed head the discharge muff extends at least closely to the cover part of the brewing bag which is inserted in the brewing inset.

9. A filter coffee brewing apparatus according to claim 8, wherein the double-walled collar of the brewing bag is at most sealed in its top area.

* * * * *